(12) United States Patent  (10) Patent No.: US 8,904,078 B2
DeCesaris et al.  (45) Date of Patent: Dec. 2, 2014

(54) HIGH SPEED SERIAL PERIPHERAL INTERFACE SYSTEM

(71) Applicant: International Business Machines Corporation, Armonk, NY (US)

(72) Inventors: Michael DeCesaris, Carrboro, NC (US); Luke D. Remis, Raleigh, NC (US); Gregory D. Sellman, Morrisville, NC (US); Steven L. Vanderlinden, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 13/657,501

(22) Filed: Oct. 22, 2012

(65) Prior Publication Data

US 2014/0115222 A1  Apr. 24, 2014

(51) Int. Cl.
*G06F 13/20* (2006.01)
*G06F 13/42* (2006.01)
*G06F 13/00* (2006.01)
*G06F 13/36* (2006.01)

(52) U.S. Cl.
USPC ........... 710/307; 710/105; 710/106; 710/313; 710/315

(58) Field of Classification Search
USPC .............. 710/62, 65–66, 105–106, 305–307, 710/311, 313–315
See application file for complete search history.

(56) References Cited

U.S. PATENT DOCUMENTS

| | | | |
|---|---|---|---|
| 6,972,979 B2 * | 12/2005 | Iida et al. | 365/51 |
| 7,044,389 B2 * | 5/2006 | Nishizawa et al. | 235/492 |
| 7,159,064 B2 | 1/2007 | Gillet | |
| 7,328,299 B2 * | 2/2008 | Przybysz et al. | 710/307 |
| 7,606,952 B2 | 10/2009 | Chen | |
| 7,818,529 B2 * | 10/2010 | Hou | 711/167 |
| 8,015,340 B2 | 9/2011 | Cedar et al. | |
| 8,688,944 B2 * | 4/2014 | Alon et al. | 711/168 |
| 2005/0182881 A1 | 8/2005 | Chou et al. | |
| 2008/0059768 A1 | 3/2008 | Hung et al. | |
| 2009/0006790 A1 * | 1/2009 | Bartley et al. | 711/157 |
| 2010/0064089 A1 | 3/2010 | Eggleston | |
| 2011/0072297 A1 | 3/2011 | Huang | |
| 2012/0084491 A1 * | 4/2012 | Park et al. | 711/103 |
| 2013/0138879 A1 * | 5/2013 | Kulkarni | 711/114 |

OTHER PUBLICATIONS

"Serial Peripheral Interface (SPI) Flash Memory: Multiple I/Os Bring High Performance to Low-Cost Memory Subsystems". 2009. Spansion LLC.*

(Continued)

*Primary Examiner* — Thomas J Cleary
(74) *Attorney, Agent, or Firm* — Katherine S. Brown; Jeffrey L. Streets (57) ABSTRACT

A serial peripheral interface (SPI) system including a bus adapter is disclosed. The bus adapter may include a data converter that may be adapted to receive respective first and second data from a first master output peripheral input (MOPI) line and a chip select line from a SPI master device. The data converter may also be adapted to interleave the first and second data, and the data converter may be adapted to transmit the interleaved first and second data synchronously with a second clock signal on a second MOPI line. The bus adapter may also include a clock rate adjuster adapted to generate the second clock signal to transmit to a SPI peripheral device. The second clock signal may be adapted to enable the SPI peripheral device to read the transmitted data.

19 Claims, 6 Drawing Sheets

(56) References Cited

OTHER PUBLICATIONS

"VS23S010—1 Megabit SPI SRAM with Serial and Parallel Interface and Integrated Pattern Generator". Version .6. Jun. 14, 2006. VLSI Solution.*

Anonymous, "High-Speed adaptive sampling using an SPI module", IPCOM Prior Art Database, pp. 1-6, Published Jan. 12, 2006. http://www.ip.com/pubview/IPCOM000133087D.

Anonymous, "SDIO Emulation Over SPI Without SPI Mode in SDHC Master", IPCOM Prior Art Database, pp. 1-6, Published Jul. 22, 2010. http://priorartdatabase.com/IPCOM/000197935.

Pruss, "Method to Facilitate Double Half-Duplex Transfers on a SPI Bus", IPCOM Prior Art Database, pp. 1-4, ©°2011 Motorola Inc., Published Apr. 11, 2011. http://www.ip.com/pubview/IPCOM000004894D.

* cited by examiner

HIGH SPEED SERIAL PERIPHERAL INTERFACE SYSTEM

FIELD

The present invention generally relates to the data transfer field, and more particularly, relates to serial peripheral interface (SPI) buses.

BACKGROUND

A serial peripheral interface bus (SPI) is a synchronous serial data link standard that is in full duplex mode between a SPI master device and one of a possible many SPI peripheral devices. SPI devices typically have four transmission lines between the master and peripheral devices. Flexible protocol and simple hardware interfacing of SPI are some of its many advantages. SPI is often used in sensors such as temperature, pressure, analog to digital converters, and touch screens. SPI may also be used in control devices, camera lenses, communications such as Ethernet and USB, flash memory, real-time clocks, and LCD displays to name a few.

SUMMARY

In one aspect, a method of a fast SPI system is described. In one operation of the method a respective first data and second data from a first master output peripheral input (MOPI) line and a chip select line of a SPI master device may be received. The first and second data may be interleaved. The interleaved first and second data may be transmitted synchronously with a second clock signal on a second MOPI line. The second clock signal may be generated to transmit to a SPI peripheral device. The second clock signal may be adapted to enable the SPI peripheral device to read the transmitted data.

In another aspect, a bus adapter is described. The bus adapter may include a data converter that may be adapted to receive respective first and second data from a MOPI line and a chip select line from a SPI master device. The data converter may also be adapted to interleave the first and second data, and the data converter may be adapted to transmit the interleaved first and second data synchronously with a second clock signal on a second MOPI line. The bus adapter may also include a clock rate adjuster adapted to generate the second clock signal to transmit to a SPI peripheral device. The second clock signal may be adapted to enable the SPI peripheral device to read the transmitted data.

In yet another aspect, a design structure is described of the bus adapter above.

BRIEF DESCRIPTION OF THE DRAWINGS

In the drawings and the Detailed Description, like numbers generally refer to like components, parts, steps, and processes.

DETAILED DESCRIPTION

A serial peripheral interface (SPI) is a single bit, serial communication bus used in computers and other electronic systems. SPI has been widely adopted because of its simplicity and vast number of peripherals available. One draw back to SPI, for some applications, is the relatively low speed data transfer of SPI. The maximum speed of SPI may be dependent upon signal integrity, especially when sending signals over long distances. Faster speeds over long distances along with other factors such as, but not limited to, noise, material, and temperature may result in inaccurate signals. For some applications, a system designer may often trade out the simplicity of SPI, for a more complex, high speed interface or mitigate the detrimental effects on signal integrity through expensive additions to the circuitry.

Due to signal integrity issues at long distances, SPI data transfer may have to be slowed to produce a reliable signal. A SPI system that transfers the same amount of data at slow speeds may help correct signal integrity issues and allow for use of simple SPI systems in certain electronic applications. Furthermore, a SPI system with this capability may run at faster speeds when signal integrity is not an issue. SPI protocol may use four transmission lines: forwarded clock, a serial input (MIPO), a serial output (MOPI), and a chip-select (CS) to control SPI peripheral devices. The CS signal may only be used when the SPI master device wants to select a particular device. Otherwise, the signal remains at a fixed value. There is a potential for the SPI master device to use the CS signal to also send data to the peripheral when the CS signal remains at a fixed value, which essentially may increase the amount of data the SPI master device may send by two fold.

According to aspects, the CS line may be used when transferring data from the SPI master device to SPI peripheral devices to increase the speed of the data transfer. This may be accomplished by transferring data on both the MOPI and CS transmission lines and then combining or interleaving them further down the transmission lines onto the MOPI line on both the rising and falling edges of the SPI master device clock signal. The clock signal of the SPI peripheral may be increased to read the interleaved data on the MOPI line entering the SPI peripheral device.

Figure 1:
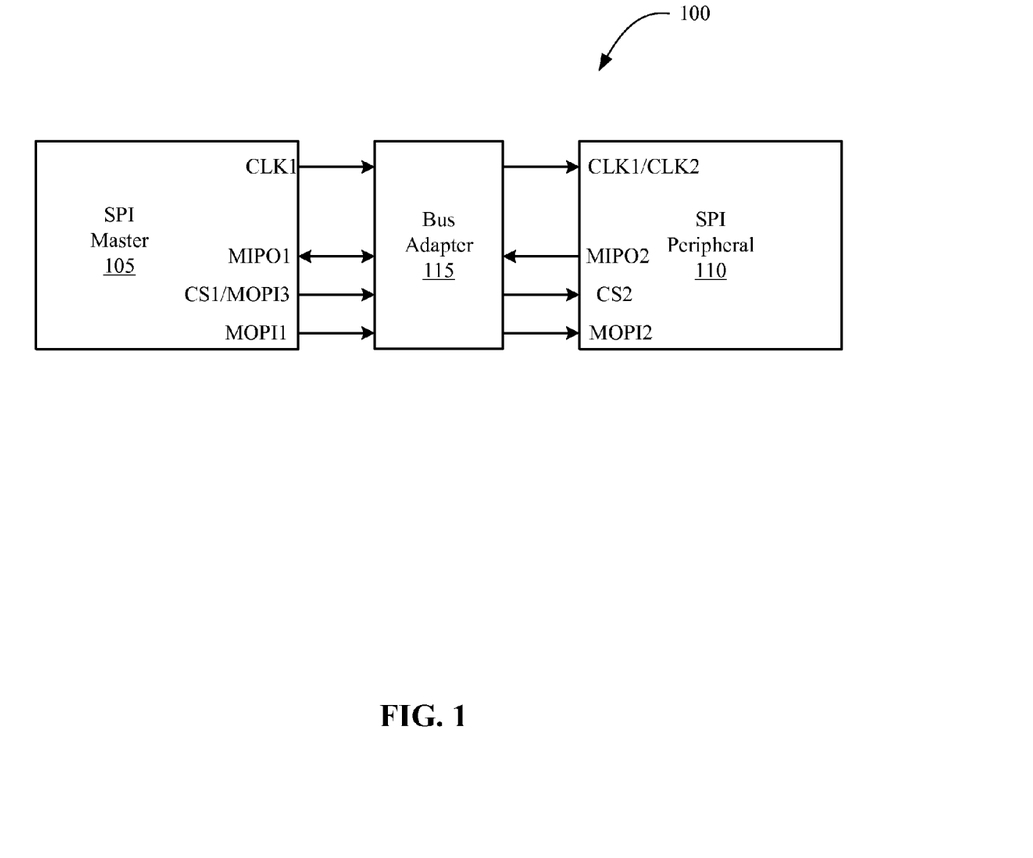
FIG. 1 is a high-level block diagram of a SPI system, according to an aspect.

According to one aspect, a high-level block diagram of a SPI system 100 is illustrated in FIG. 1. The SPI system 100 may contain a SPI master device 105, one or more SPI peripheral devices 110, and a bus adapter 115. The SPI master device 105 may contain four pins with respective lines. However, other pin configurations may be implemented. Each pin may include its own respective line, along which signals may transfer to and from the pin. The four pins may be a clock pin signaling a first clock signal CLK1, a serial input, such as a first master input peripheral output (MIPO) pin, signaling or receiving a first MIPO signal MIPO1, a first chip select (CS) pin signaling a first chip select signal CS1, and a serial output such as a first master output peripheral input (MOPI) pin signaling a first MOPI signal MOPI1, also referred to herein as a first data. The CS pin may also be adapted to signal a third MOPI signal MOPI3, also referred to herein as a second data. The SPI system 100 may be adapted to operate in multiple data transfer modes, such as a normal mode and a fast mode. MOPI3 may signal along the CS line when the SPI system 100 is in the fast mode. CS1 may be signaled along the CS line when the SPI system 100 is in the normal mode.

The SPI peripheral device 110 may also include four pins with respective lines. The four pins may be a clock pin receiving a second clock signal CLK2, a second MIPO pin signaling a second MIPO signal MIPO2, a second CS pin receiving a second CS signal CS2, and a second MOPI pin with a second MOPI line receiving a second MOPI signal MOPI2.

Between the SPI master device 105 and the SPI peripheral device 110 may be the bus adapter 115. The bus adapter 115 may be its own independent chip, according to an aspect. In another aspect, the bus adapter 115 may be integrated into the SPI peripheral device 110. In yet another aspect, the bus adapter 115 may be integrated into the SPI master device 105. The bus adapter 115, in relation to the SPI master device 105 and SPI peripheral device 110, may correlate with an optimal location that allows for optimal signal integrity. The bus adapter 115 may communicate with the four pins of the SPI master device 105. The bus adapter 115 may also communicate with the four pins of the SPI peripheral device 110.

Referring to SPI master device 105, CLK1 may signal the bus adapter 115. The bus adapter 115 may be adapted to adjust CLK1 faster or slower and output the adjusted CLK1 as CLK2. The bus adapter 115 may signal the SPI peripheral device 110 with CLK2, which may be CLK1 or a combination of CLK1 and CLK2. The speed of CLK2 may depend on the current mode of the SPI system 100.

Although typically reserved for input signals from the peripheral, the SPI master device 105 MIPO pin may signal the bus adapter 115 with MIPO1. MIPO1 may initiate the fast mode or the normal mode when signaling the bus adapter 115. The SPI master device 105 MIPO pin may also be adapted to receive MIPO2 from the SPI peripheral device 110. MIPO2 may contain a data stream that the SPI master device 105 may read.

CS1 may signal the bus adapter 115. The bus adapter 115 may transfer CS1 to the SPI peripheral device 110 as CS2. CS1 may signal which SPI peripheral device, of one or more SPI peripheral devices, the SPI master device 105 is to communicate. CS1 may also signal the fast mode, which may enable the use of a CS transmission line to be used by a third MOPI signal MOPI3.

MOPI1 may signal the bus adapter 115. MOPI1 may include the write data to be written to the SPI peripheral device 110. The bus adapter may forward MOPI1 to the SPI peripheral device. The forwarded MOPI1 may be a second MOPI signal MOPI2. MOPI2 may include the MOPI1 signal in normal mode and a combination of MOPI1 and MOPI3 in fast mode. MOPI3 may be the additional data signal on the CS line for increasing the data rate.

Figure 2:
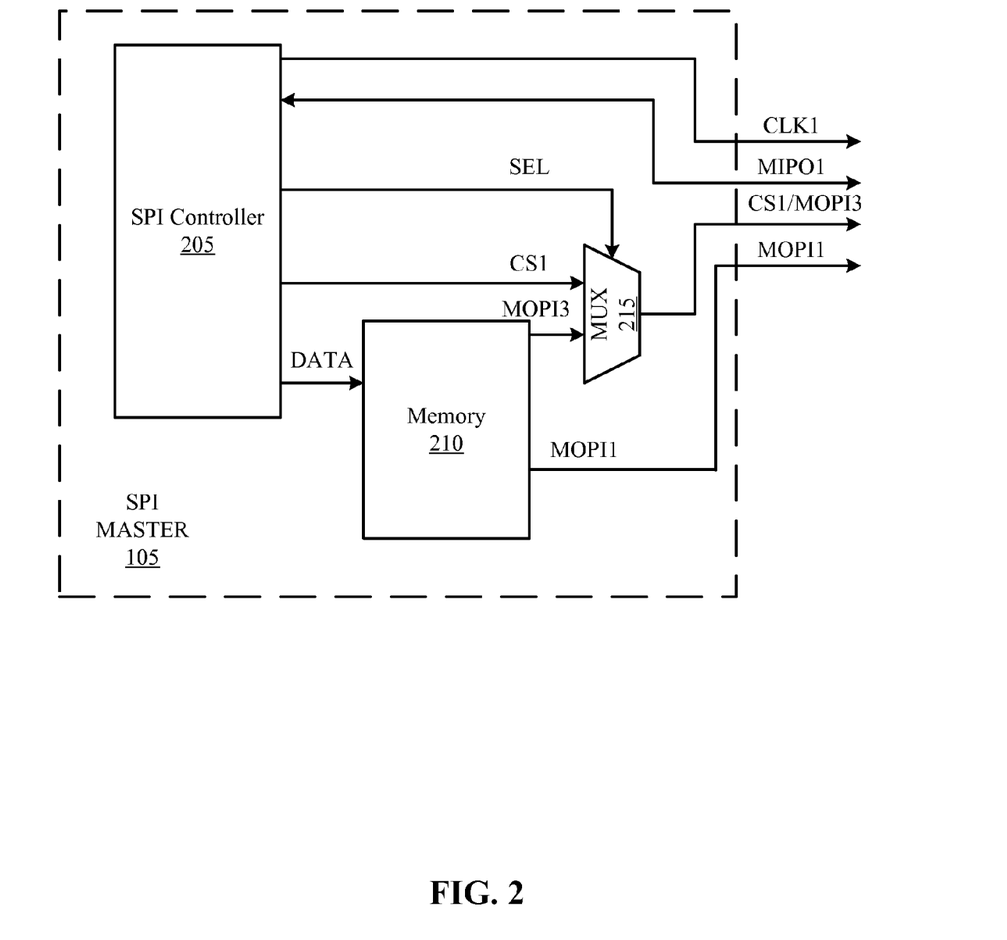
FIG. 2 is a circuit diagram of an exemplary SPI master device of FIG. 1, according to an aspect.

According to an aspect, an exemplary SPI master device 105 is illustrated in FIG. 2. The SPI master device 105 may include a SPI controller 205, a memory 210, and a multiplexer (MUX) 215. The SPI controller 205 may control the SPI system 100. The SPI controller 205 may contain instructions or logic to control the signaling of the SPI master device 105. The SPI controller 205 may also contain instructions or logic to control when the SPI system 100 switches between normal mode and fast mode. The SPI controller 205 may determine the clock rate of the SPI system 100, thus signaling CLK1 to the SPI peripheral device 110. The SPI controller may further receive MIPO1 or signal the bus adapter 115 with MIPO1 to switch the SPI system 100 between normal mode and fast mode. The SPI controller 205 may also signal a fast mode signal SEL, discussed further below. The SPI controller 205 may also signal CS1 to select a SPI peripheral device 110 to communicate with the SPI master device 105. CS1 may also be used in enabling or disabling a fast mode. The SPI controller 205 may signal the memory 210 such as, but not limited to, registers, with a data signal DATA.

The memory 210 may divide the DATA into MOPI3 and MOPI1 for the fast mode. In normal mode, memory 210 may only signal MOPI1. The MUX 215 may be a two input one output MUX. MUX 215 may switch between signaling MOPI3 from memory 210 or CS1. SEL, from the SPI controller 205, may signal a selector of MUX 215, which may cause MUX 215 to select whether CS1 or MOPI3 is to be signaled by MUX 215. For example, if SEL is a logical '1', then CS1 may be selected and if SEL is a logical '0' MOSI3 may be selected. The selection of MOSI3 may allow the CS line to be used for sending additional data to the SPI peripheral device 110 during the fast mode by sending data on two lines at the SPI master clock speed and interleaving, alternating, or combining the data near the SPI peripheral 110 to obtain a faster data rate when read by the SPI peripheral 110 at a faster clock rate.

Figure 3:
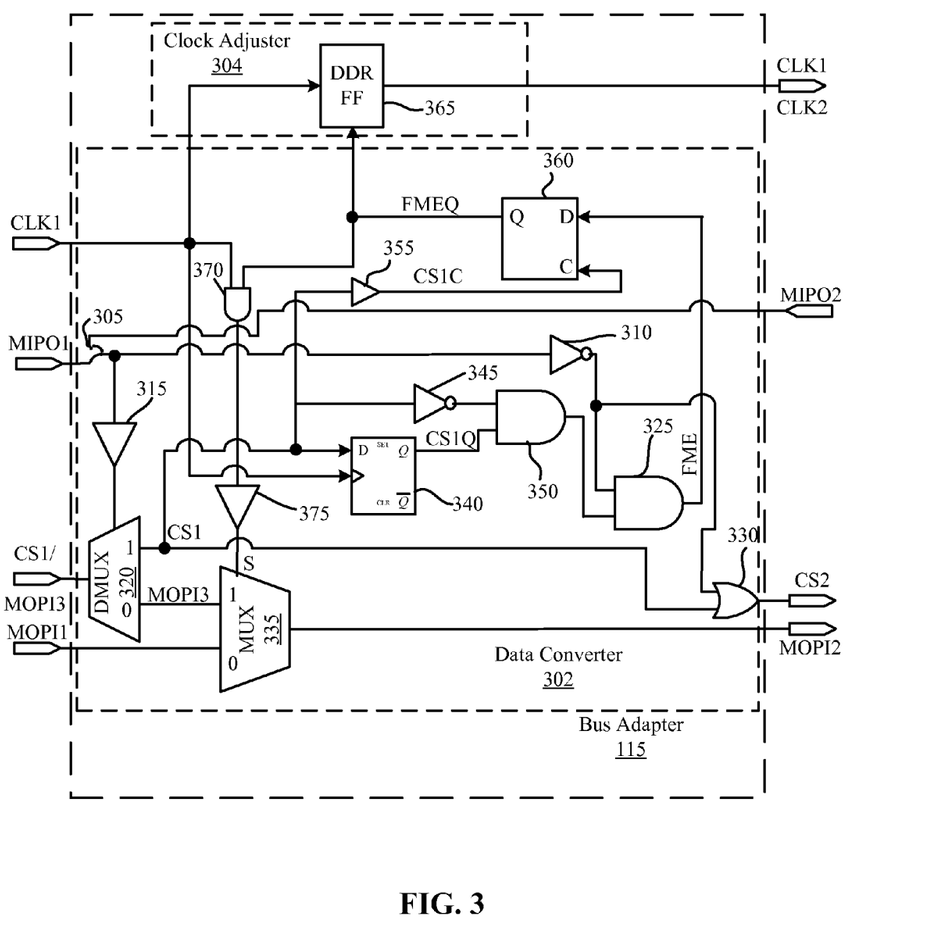
FIG. 3 is a circuit diagram of an exemplary bus adapter of FIG. 1, according to an aspect.

According to an aspect, FIG. 3 illustrates an exemplary circuit diagram of the bus adapter 115. The bus adapter 115 may include a data converter 302 and a clock adjuster 304. In the fast mode, the data converter 302 may be adapted to receive the first data or MOPI1 from the first MOPI line. The data converter 302 may also be adapted to receive the second data 304 (MOPI3) from the CS line. The data converter 302 may interleave the first and second data and then transmit the interleaved first and second data synchronously with the second clock signal CLK2 on the second MOPI line as the MOPI2 signal to the SPI peripheral device 110. The data converter 302 may also be configured to switch the SPI system 100 between the fast mode and the normal mode. The data converter 302 may switch to only receiving the first data from only the first MIPO line and transmitting the first data synchronously with the first clock signal CLK1 on the second MOPI line. In one example, fast mode may transfer twice as much data from the SPI master device 105 to the SPI peripheral device 110. The bus adapter 115 may also generate the second clock signal CLK2 and the first clock signal CLK1 with a clock rate adjuster 304. The clock rate adjuster 304 may transmit the fast or normal mode clock signal, CLK2 and CLK1, respectively, to the SPI peripheral device 110. Each clock signal may be adapted to enable the SPI peripheral device to read the transmitted data for which the clock signal is generated.

FIG. 3 illustrates an exemplary circuit diagram of an exemplary bus adapter 115 that includes a clock adjuster 304 and data converter 302. In FIG. 3 the first MIPO line may be switched at switch 305 so that instead of MIPO2 from the SPI peripheral device 110 signaling the SPI master device 105, the SPI master device 105 may signal a fast mode signal, MIPO1, from SPI master device 105 to the bus adapter 115. In one example, MIPO1 may assert to initiate the transition from normal mode of the SPI system 100 to a fast mode. MIPO1 may signal an input of an inverter 310 and an input of a buffer 315. Buffer 315 may derive a delayed MIPO1 signal. The delayed MIPO1 may signal a selector of a demultiplexor DMUX 320. DMUX 320 may be a one input and two output DMUX. The input of DMUX 320 may receive the CS1 or MOPI3 signal from MUX 215 (FIG. 2) along the CS line. DMUX 320 may have a first output of CS1 and a second output of MOPI3 that the delayed MIPO1 may select through the selector of the DMUX 320. Buffer 315 may be used as a delay to allow CS1 to signal the initiation of the fast mode along with MIPO1 in the bus adapter 115 before the DMUX 320 switches the CS line from signaling CS1 to the CS line signaling MOPI3 in fast mode.

Inverter 310 may derive an inverted MIPO1 signal. The inverted MIPO1 signal may signal a first input of an AND 325 and a first input of an OR 330. A second input of OR 330 may receive CS1 derived from the first output of DMUX 320. The second output of MOPI3 may signal a first input of a two input, one output MUX 335. MUX 335 may have a second input receiving MOPI1.

CS1 derived from the first output of DMUX 320 may signal a D flip-flop 340, an inverter 345, and a buffer 355. The D flip-flop 340 may also receive CLK1. D flip-flop 340 may derive signal CS1Q, which may signal a first input of AND 350. Inverted CS1 signal derived by inverter 345 may signal a second input of AND 350. The signal derived by AND 350 may signal a second input of AND 325. AND 325 may derive a fast mode enable signal FME. FME may signal a D input of a D latch 360. Buffer 355 may derive a buffered CS1 signal CS1C, which may signal a C input of D latch 360.

D latch 360 may derive a FMEQ signal, which may signal dual data rate flip-flop DDR FF 365 and a first input of an AND gate 370. DDR FF 365 may also receive CLK1. When FMEQ is asserted, DDR FF 365 may derive CLK2, which may double the clock speed of CLK1 in fast mode, for example. CLK1 may also signal a second input of AND 370. AND 370 may derive CLK1 to a buffer 375. Buffer 375 may provide a delayed CLK1, a signal S, to a selector of MUX 335 while the SPI system 100 is in fast mode. MUX 335 may derive MOPI2, which may be MOPI1 in normal mode and a combination of MOPI1 and MOPI3 in fast mode. In fast mode MOPI2 may be interleaved MOPI1 and MOPI3 data signals As an illustrative example in FIG. 3, MUX 335 may signal MOPI3 when S is a logical '1' and MUX 335 may signal MOPI1 when S is a logical '0'. When SPI system 100 is in normal mode S may remain at a logical '0' thus only MOPI1 is getting transferred into MOPI2. However, while in fast mode, S may alternate between logical '1s' and logical '0s' by following CLK1. This may result in MOPI2 containing both MOPI1 and MOPI3 data on the rising and falling edge of CLK1, respectively. This may result in the interleaving of MOPI1 and MOPI3. The SPI peripheral device 115 may read MOPI2 on the rising edge of the clock signal of the system. Thus, to read data that is sent on the rising and falling edge of CLK1, CLK2 may need to be twice as fast as CLK1. Being twice as fast, the rising edges of CLK2 may correlate with the rising and falling edges of CLK1.

Figure 4:
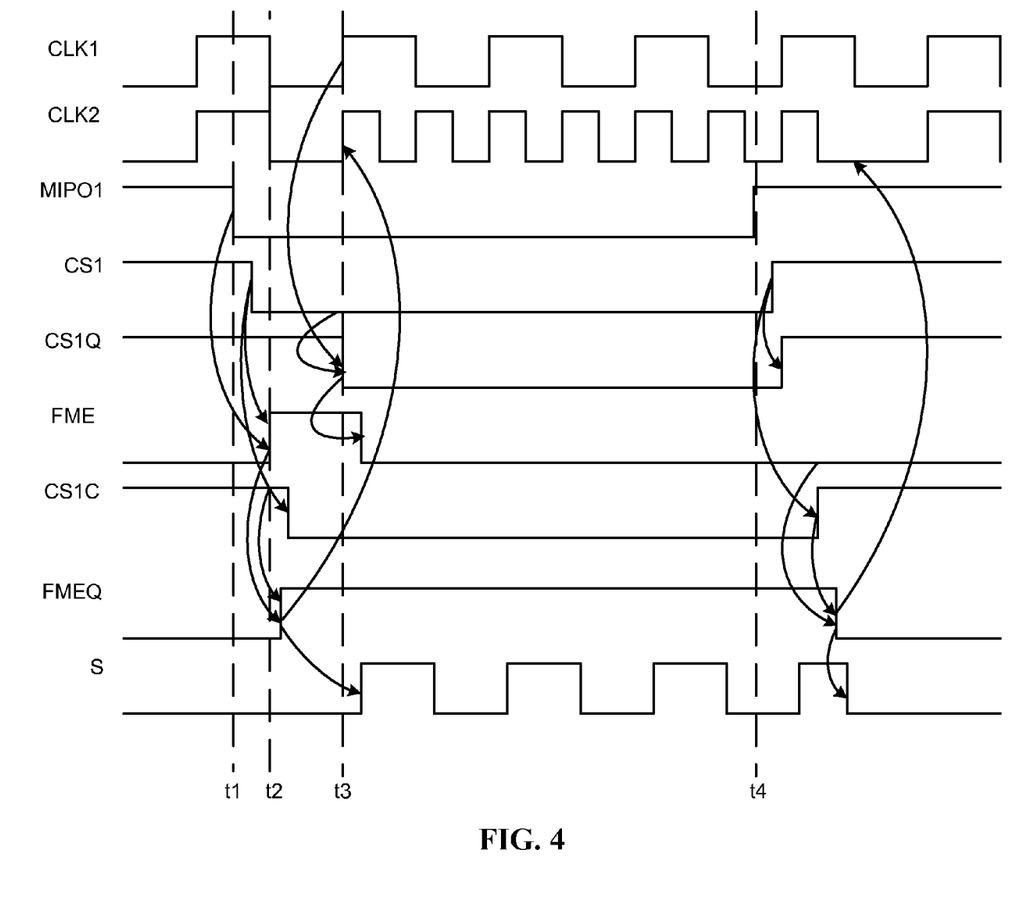
FIG. 4 is a timing diagram of the SPI system during a fast and normal mode, according to an aspect.

According to an aspect, FIG. 4 illustrates an exemplary timing diagram of the SPI system 100 switching from normal mode to fast mode and back to normal mode. At time t1, fast mode may initiate when MIPO1 asserts by MIPO1 transitioning from high to low and followed by CS1 asserting by CS1 transitioning from high to low. The assertion of CS1 and MIPO1 low signals FME to assert by FME transitioning from low to high. Because of the D flip-flop 340 (FIG. 3), CS1 asserting low along with the rising edge of CLK1 may signal CS1Q to assert by transitioning CS1Q from high to low. CS1 asserting low may also cause the output of buffer 355 (FIG. 3) CS1C to assert by transitioning CS1C from high to low.

At time t2, the assertion of FME high and CS1C de-asserted may signal FMEQ to assert by transitioning FMEQ from low to high. CS1C may assert by transitioning CS1C from high to low before FME de-asserts by transitioning FME from high to low. This may allow the D latch to hold the fast mode enable FMEQ high while the SPI system is still in fast mode, which may be controlled by MIPO1 and CS1. The assertion of FMEQ high may signal S to activate and be a delayed CLK1 signal controlling the output of MUX 335, MIPO2, to be a combination of MOPI3 and MOPI1. The assertion of FMEQ high may also signal DDR FF 365 to double the speed of CLK1. Thus, at time t3 CLK2 may be twice as fast as CLK1. CLK2 may enable the SPI peripheral device 110 (FIG. 1) to read the double data rate of MOPI2. Also at time t3, CS1Q asserting low may signal FME to de-assert by transitioning FME from high to low.

To disable fast mode and enable normal mode the SPI controller 205 (FIG. 2) may de-assert MIPO1 by transitioning MIPO1 from low to high at time t4. SEL may signal MUX 215 to select CS1 to signal the CS1/MOPI3 line. MIPO1 may also signal DMUX 320 (FIG. 3) to select CS1 to be first output of DMAX 320. SPI controller 205 may de-assert CS1 by transitioning CS1 from low to high. The de-assertion of CS1 high may signal CS1Q and CS1C to de-assert by transitioning both signals from low to high. The de-assertion of CS1C high and the de-assertion of FME low may signal FMEQ to de-assert by transitioning FMEQ from high to low. The de-assertion of FMEQ low may signal DDR FF 365 to return CLK2 to the same speed as CLK1. The de-assertion of FMEQ low may also signal S to transition low. S transitioned low may signal MOPI2 of MUX 335 to be MOPI1 data.

While the Detailed Description may refer to specific types of transistors, logic gates, supply voltages, and the like it will be appreciated that one skilled in the art may implement the same or similar functions using different transistors, logic gates, and supply voltages in alternative aspects as described and still accomplish the same purpose of the invention. For example, transistors may be PFETs or NFETs. Logic gates may be AND, OR, XOR, NOR, NAND, XNOR or inverters. Therefore, the scope of the invention should not be limited.

Figure 5:
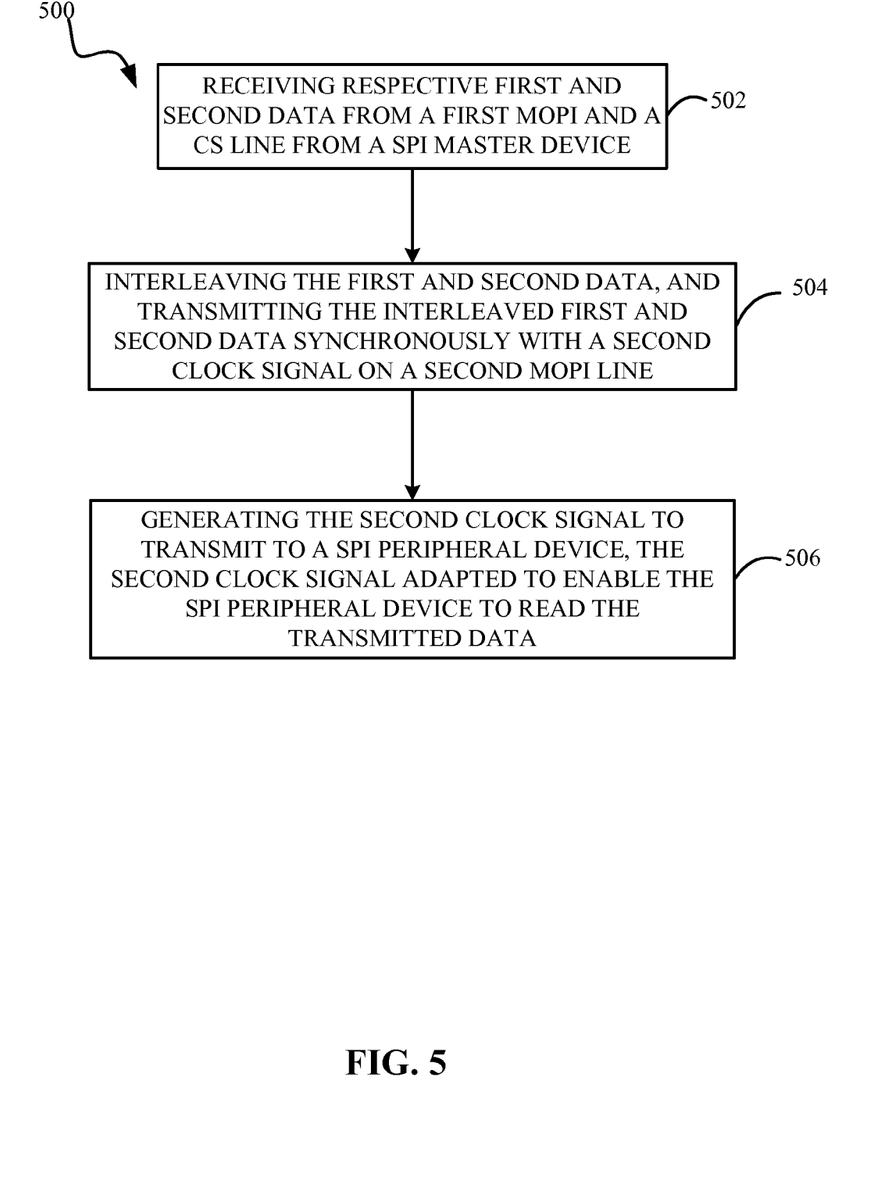
FIG. 5 is a block diagram of a method, according to an aspect.

According to one aspect, a method 500 is illustrated in FIG. 5. The method 500 describes transferring data on the SPI system 100 in fast mode. In operation 502, a bus adapter 115 may receive first data MOPI1 from the first MOPI line and the second data MOPI3 from the CS line from the SPI master device 105. In operation 504, the bus adapter may interleave the first and second data, and may transmit the interleaved first and second data synchronously with a second clock signal CLK2 on the second MOPI line. Because the first data and the second data may be signaled on the rising and falling edge of CLK1, respectively, in fast mode, the first and second data may be said to be interleaved. The transmitted interleaved data, therefore, may contain first data, second data, first data, second data, and so on, for example. In operation 506, the bus adapter 115 may generate the second clock signal CLK2 to transmit to a SPI peripheral device 110. CLK2 may be adapted to enable the SPI peripheral device 110 to read the transmitted data.

Figure 6:
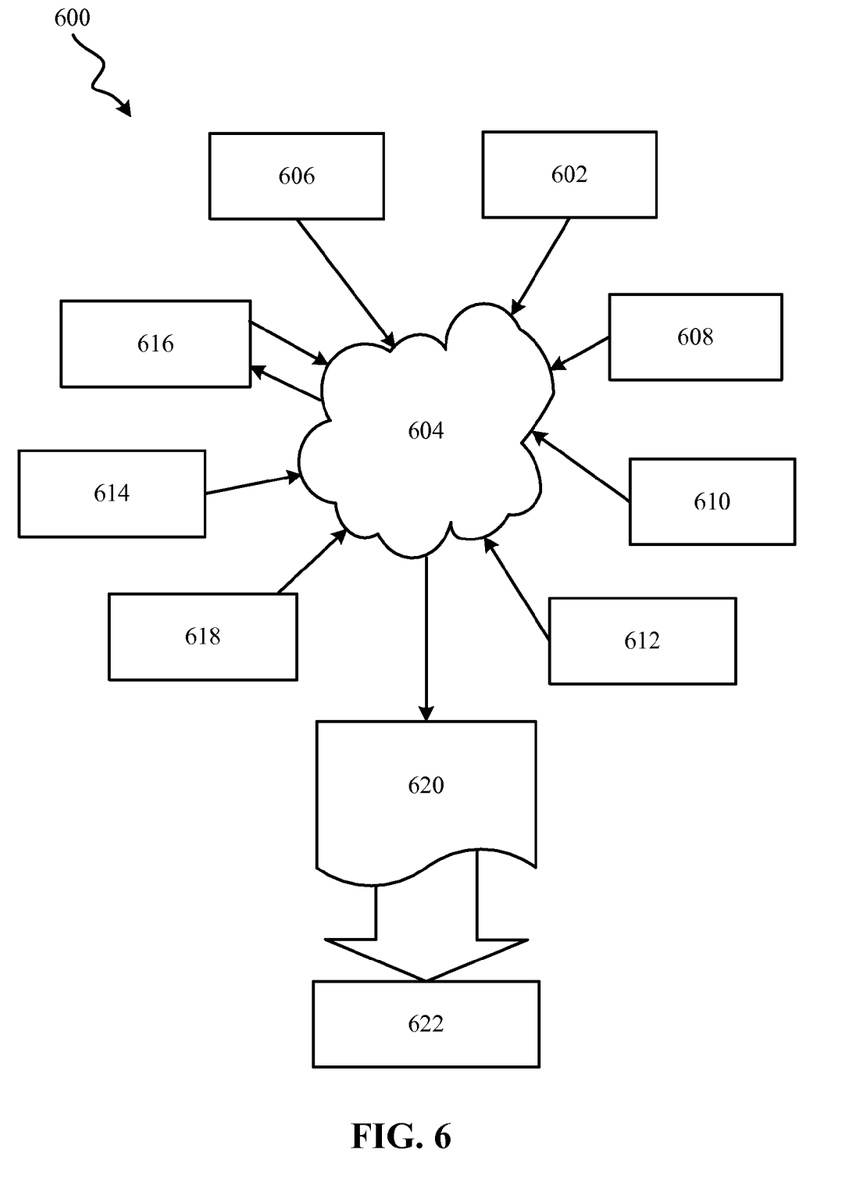
FIG. 6 is a flow diagram of a design process used in semiconductor design, manufacturing, and testing, according to an aspect.

FIG. 6 shows a block diagram of an example design flow 600 that may be used for the SPI system 100 described herein. Design flow 600 may vary depending on the type of integrated circuit (IC) being designed. For example, a design flow 600 for building an application specific IC (ASIC) may differ from a design flow 600 for designing a standard component. Design structure 602 is preferably an input to a design process 604 and may come from an IP provider, a core developer, or other design company or may be generated by the operator of the design flow, or from other sources. Design structure 602 comprises SPI system 100, SPI master device 105, SPI peripheral device 110, and bus adapter 115 in the form of schematics or HDL, a hardware-description language, for example, Verilog, VHDL, C, and the like. Design structure 602 is tangibly contained on, for example, one or more machine readable storage mediums. For example, design structure 602 may be a text file or a graphical representation of SPI system 100, SPI master device 105, SPI peripheral device 110, and bus adapter 115. Design process 604 preferably synthesizes, or translates, SPI system 100, SPI master device 105, SPI peripheral device 110, and bus adapter 115 into a netlist 606, where netlist 606 is, for example, a list of wires, transistors, logic gates, control circuits, I/O, models, etc. that describes the connections to other elements and circuits in an integrated circuit design and recorded on at least one or more machine readable storage medium. This may be an iterative process in which netlist 606 is resynthesized one or more times depending on design specifications and parameters for the circuit.

Design process 604 may include using a variety of inputs; for example, inputs from library elements 608 which may house a set of commonly used elements, circuits, and devices, including models, layouts, and symbolic representations, for a given manufacturing technology, such as different technology nodes, 32 nm, 45 nm, 60 nm, and the like, design specifications 610, characterization data 612, verification data 614, design rules 616, and test data files 618, which may include test patterns and other testing information. Design process 604 may further include, for example, standard circuit design processes such as timing analysis, verification, design rule checking, place and route operations, and the like. One of ordinary skill in the art of integrated circuit design can appreciate the extent of possible electronic design automation tools and applications used in design process 604 without deviating from the scope and spirit of the invention. The design structure of the invention is not limited to any specific design flow.

Design process 604 preferably translates an embodiment of the invention as shown in FIGS. 1-5 along with any additional integrated circuit design or data (if applicable), into a second design structure 620. Design structure 620 resides on a machine readable storage medium in a data format used for the exchange of layout data of integrated circuits, for example, information stored in a GDSII (GDS2), GL1, OASIS, or any other suitable format for storing such design structures. Design structure 620 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-5. Design structure 620 may then proceed to a stage 622 where, for example, design structure 620 proceeds to tape-out, is released to manufacturing, is released to a mask house, is sent to another design house, is sent back to the customer, and the like.

While the present invention has been described with reference to the details of the aspects shown in the drawings, these details are not intended to limit the scope of the invention as claimed in the appended claims.

What is claimed is:

1. A method, comprising:
   receiving a respective first and second data from a first master output peripheral input (MOPI) line and a chip select line from a SPI master device;
   interleaving the first and second data, and transmitting the interleaved first and second data synchronously with a second clock signal on a second MOPI line; and
   generating the second clock signal to transmit to a SPI peripheral device, the second clock signal adapted to enable the SPI peripheral device to read the transmitted data.

2. The method of claim 1, further comprising:
   switching from receiving respective first and second data from the first MOPI line and a chip select line from a SPI master device to receiving first data from only the first master input peripheral output (MIPO) line; and
   transmitting the first data synchronously with a first clock signal on the second MOPI line.

3. The method of claim 2, further comprising:
   generating the first clock signal to transmit to the SPI peripheral device, the first clock signal adapted to enable the SPI peripheral device to read the transmitted data.

4. The method of claim 1, wherein the chip select line is adapted to transfer the second data and to select one of a plurality of SPI peripheral devices for communication with the SPI master device.

5. The method of claim 1, wherein the SPI master device is adapted to send respective first and second data on the first MOPI line and the chip select line.

6. A bus adapter comprising:
   a data converter adapted to receive respective first and second data from a first master output peripheral input (MOPI) line and a chip select line from a SPI master device, the data converter also adapted to interleave the first and second data, and transmit the interleaved first and second data synchronously with a second clock signal on a second MOPI line; and
   a clock rate adjuster adapted to generate the second clock signal to transmit to a SPI peripheral device, the second clock signal adapted to enable the SPI peripheral device to read the transmitted data.

7. The bus adapter of claim 6, further comprising:
   the data converter adapted to switch to receive only the first data from a first master input peripheral output (MIPO) line and to transmit the first data synchronously with a first clock signal on the second MOPI line.

8. The bus adapter of claim 7, further comprising:
   the clock rate adjuster adapted to generate the first clock signal to transmit to a SPI peripheral device, the first clock signal adapted to enable the SPI peripheral device to read the transmitted data.

9. The bus adapter of claim 6, wherein the chip select line is adapted to transfer the second data and to select one of a plurality of SPI peripheral devices for communication with the SPI master device.

10. The bus adapter of claim 6, wherein the SPI master device is adapted to send respective first and second data on the first MOPI line and the chip select line.

11. The bus adapter of claim 6, wherein the bus adapter is integrated into the SPI master device.

12. The bus adapter of claim 6, wherein the bus adapter is integrated into the SPI peripheral device.

13. The bus adapter of claim 6, wherein the bus adapter is an independent semiconductor chip between the SPI master device and the SPI peripheral device.

14. The bus adapter of claim 13, wherein the independent bus adapter is located between the SPI master device and the SPI peripheral device to correlate with an optimal signal integrity.

15. A design structure tangibly embodied in a machine-readable medium used in a design process, the design structure comprising:
   a bus adapter including:
     a data converter adapted to receive respective first and second data from a first master output peripheral input (MOPI) line and a chip select line from a SPI master device, the data converter also adapted to interleave the first and second data, and transmit the interleaved first and second data synchronously with a second clock signal on a second MOPI line; and
     a clock rate adjuster adapted to generate the second clock signal to transmit to a SPI peripheral device, the second clock signal adapted to enable the SPI peripheral device to read the transmitted data.

16. The design structure of claim 15, further comprising:
the data converter adapted to switch to receive only the first data from a first master input peripheral output (MIPO) line and to transmit the first data synchronously with a first clock signal on the second MOPI line.

17. The design structure of claim 16, further comprising:
the clock rate adjuster adapted to generate the first clock signal to transmit to a SPI peripheral device, the first clock signal adapted to enable the SPI peripheral device to read the transmitted data.

18. The design structure of claim 15, wherein the chip select line is adapted to transfer the second data and to select one of a plurality of SPI peripheral devices for communication with the SPI master device.

19. The design structure of claim 15, wherein the SPI master device is adapted to send respective first and second data on the first MOPI line and the chip select line.

* * * * *